(12) United States Patent
Stewart et al.

(10) Patent No.: US 8,828,236 B2
(45) Date of Patent: Sep. 9, 2014

(54) LIGHT WEIGHT ORIENTED NET ASSEMBLY FOR OIL CAPTURE AND CONTAINMENT

(75) Inventors: Matthew David Stewart, Sharpsburg, GA (US); Brian Edward Connelly, McDonough, GA (US); Daniel Charles Habicht, Peachtree City, GA (US)

(73) Assignee: The Tensar Corporation, Alpharetta, GA (US)

( * ) Notice: Subject to any disclaimer, the term of this patent is extended or adjusted under 35 U.S.C. 154(b) by 581 days.

(21) Appl. No.: 13/204,130

(22) Filed: Aug. 5, 2011

(65) Prior Publication Data

US 2012/0061323 A1    Mar. 15, 2012

Related U.S. Application Data

(60) Provisional application No. 61/344,487, filed on Aug. 5, 2010.

(51) Int. Cl.
| | |
|---|---|
| *C02F 1/28* | (2006.01) |
| *E02B 15/10* | (2006.01) |
| *B01J 20/28* | (2006.01) |
| *B01J 20/26* | (2006.01) |
| *C02F 101/32* | (2006.01) |
| *C02F 1/68* | (2006.01) |

(52) U.S. Cl.
CPC .............. *C02F 1/285* (2013.01); *E02B 15/101* (2013.01); *C02F 2101/32* (2013.01); *C02F 1/681* (2013.01); *B01J 20/28014* (2013.01); *B01J 20/261* (2013.01)
USPC ............................ 210/671; 210/675; 210/693

(58) Field of Classification Search
USPC ........................................ 210/671, 675, 693
See application file for complete search history.

(56) References Cited

U.S. PATENT DOCUMENTS

| | | | |
|---|---|---|---|
| 2,919,467 A | 1/1960 | Mercer | |
| 3,070,840 A | 1/1963 | Mercer | |
| 3,252,181 A | 5/1966 | Hureau | |
| 3,317,951 A | 5/1967 | Hureau | |
| 3,384,530 A | 5/1968 | Mercer et al. | |
| 3,384,692 A | 5/1968 | Galt et al. | |
| 3,496,965 A | 2/1970 | Hureau | |
| 3,917,889 A | 11/1975 | Gaffney et al. | |
| 4,340,486 A * | 7/1982 | Swanson ...................... | 210/693 |
| 4,756,946 A | 7/1988 | Mercer | |
| 5,391,415 A * | 2/1995 | Bair ............................... | 428/74 |
| 5,423,985 A * | 6/1995 | Addeo et al. ................ | 210/242.4 |
| 5,468,536 A * | 11/1995 | Whitcomb et al. ............. | 428/98 |
| 5,518,797 A * | 5/1996 | Holland ........................ | 428/132 |
| 5,961,823 A * | 10/1999 | Alper .......................... | 210/198.1 |
| 6,312,596 B1 * | 11/2001 | Kunzelman ................ | 210/242.3 |

* cited by examiner

*Primary Examiner* — Chester Barry
(74) *Attorney, Agent, or Firm* — Jacobson Holman, PLLC.

(57) ABSTRACT

A light weight oriented net or netting assembly is provided for oil capture and containment. The netting assembly is made by biaxially stretching or orienting starting materials to form a pattern of oriented strands and integral junctions that, while being light in weight, is also strong enough to be used to capture and remove oil from contaminated water without an outer stabilizing jacket. The assembly is preferably made from oriented polypropylene netting that is folded, gathered, bunched and/or otherwise layered upon itself on the order of 16-64 times and then crimped in one or more locations to secure the netting layers in a bow tie or tubular configuration that forms net cavities and an open cell structure to capture and contain oil that has been dispersed in water. Oil in the netting assembly can then be removed, such as by pressing or other removal process, after which the netting assembly may be reused.

16 Claims, 6 Drawing Sheets

LIGHT WEIGHT ORIENTED NET ASSEMBLY FOR OIL CAPTURE AND CONTAINMENT

This application is entitled to and hereby claims the priority of co-pending U.S. provisional application Ser. No. 61/344,487, filed Aug. 5, 2010.

BACKGROUND OF THE INVENTION

1. Field of the Invention

The present invention is related to the field of oil adsorption and, more particularly, to an assembly for capturing and containing oil that has been released into water.

2. Description of the Related Art

Polypropylene is used in the oil adsorption industry for its inherent affinity for capturing and containing oil. One common configuration is a "sock" design in which a quantity of polypropylene pellets or pieces are placed within an outer shell or jacket that provides structural integrity and is permeable to oil. In use, the oil flows through the jacket or sock and adheres to the polypropylene particles for containment in the sock. Absorption media can also be placed within an outer jacket to capture oil, and these media include corn husks and cotton fibers which are disposed of after a single use. With both adsorption and absorption materials as used according to the prior art, the quantity of refuse to be disposed of can accumulate quickly in the event of a large oil spill. With typical disposal methods including incineration and/or landfill deposit, disposal can become burdensome, costs can be high, and the environment is negatively impacted.

A further disadvantage of the sock configuration is that the sock has a defined shape and size depending on the outer jacket or shell used to contain the adsorbent or absorbent material. Hence, the polypropylene or other adsorbent material cannot expand or contract with the water current or wave action.

SUMMARY OF THE INVENTION

In view of the foregoing, the present invention is directed to a light weight oriented net or netting assembly having a series of irregular or regular openings that is preferably made of polypropylene having a natural affinity for oil. For the purpose of this invention, the terms "light weight oriented net" or "light weight oriented netting" and "oriented net" or "oriented netting" are intended to mean integral oriented net or netting made by biaxially orienting (stretching) polymeric sheet-like starting material to form a pattern of oriented strands integrally interconnected by partially oriented junctions. The terms "net" and "netting" and "oriented net" and "oriented netting" are used interchangeably throughout this application. By using oriented nets, the resulting oriented net assembly, while being light in weight, is also strong enough to make an outside containment and stabilizing jacket unnecessary.

To form the desired assembly, light weight oriented net or netting, preferably made of polypropylene, is folded and/or layered upon itself until the desired number of layers have been created. The polypropylene netting layers are then gathered, bundled or otherwise drawn together at one or more points along their layered length and crimped to secure the netting layers into a bundled or gathered assembly. According to a preferred embodiment, the folded or otherwise gathered netting layers are crimped in about the center to form a "bow tie" configuration. The bow tie netting assembly can also be crimped near each of its ends and may also be crimped in additional intermediate locations, if desired. Alternatively, the gathered netting layers may be crimped near end portions thereof but not in the center to form a tubular configuration. As used herein, when features and performance of the "bow tie" netting assembly are described, it is understood that the same features and performance apply to the tubular configuration as well.

The layers of oriented netting are buoyant and have a specific gravity to remain adjacent the contaminated water surface. When layered between 16 and 64 times, the bow tie netting assembly initially captures and contains a quantity of oil approximately 20 to 25 times the initial weight of the netting. Oil in the netting can then be removed, such as by pressing, after which the assembly may be reused. During multiple re-uses, the oriented netting assembly effectively captures and contains a quantity of oil approximately 15 to 16 times its weight during each use. The reduced yield obtained during subsequent reuses is due to the polypropylene netting having a reduced affinity for oil due to oil residue that remains on the netting after the bulk of the oil has been removed.

In view of the foregoing, one object of the present invention is to overcome the drawbacks in conventional sock designs in which the sock media can only be used once.

Another object of the present invention is to provide an adsorbent medium in the form of a light weight, oriented net or netting assembly preferably made of polypropylene for capturing and containing oil that can be used and reused many times.

Yet another object of the present invention is to provide an oriented net or netting assembly in accordance with the preceding object that, due to the biaxially oriented strands interconnected by integral, partially oriented junctions, has sufficient strength within its own structure to maintain the integrity of the assembly when burdened with oil in use so as to eliminate the need for an outer jacket.

A further object of the present invention is to provide an oriented net assembly in accordance with the preceding objects that effectively attracts oil in water so that the oil can be removed from the water and then, by subjecting the oriented net assembly to a pressing or other removal process, releases the captured oil so that such oil can be refined and used.

A still further object of the present invention is to provide an oriented net assembly in accordance with the preceding objects that can be repeatedly reused and, when reused, is able to capture and contain a quantity of oil up to approximately 15 to 16 times its own weight during each use.

Another object of the present invention is to provide an oil capture and containment assembly in accordance with the preceding objects that is not complex in structure and which can be manufactured at low cost but yet efficiently captures many times its own weight in oil that has been dispersed in water.

Yet another object of the present invention is to provide an oil capture and containment assembly in accordance with the preceding objects that is environmentally friendly.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
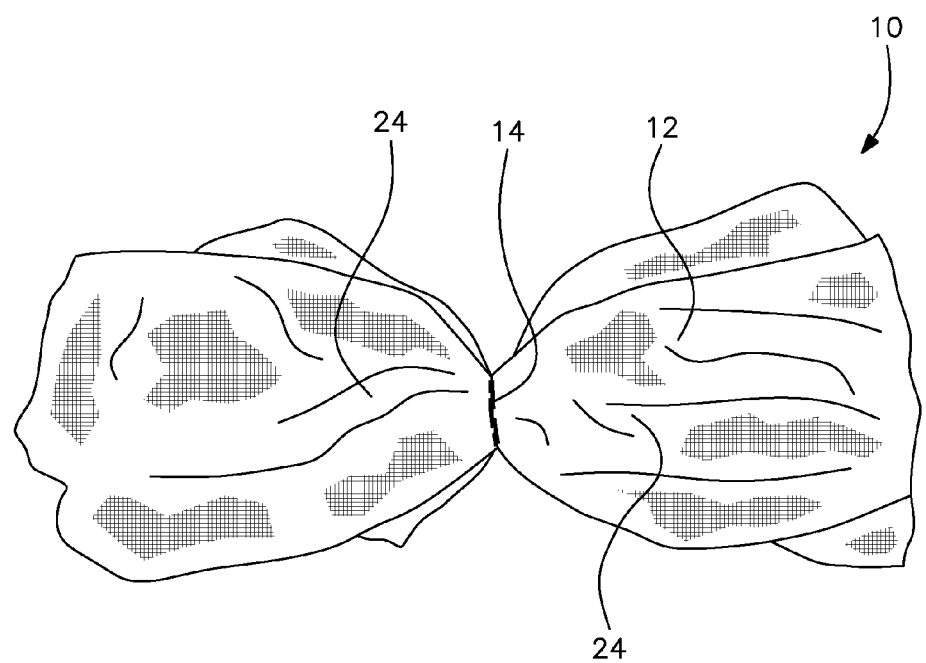
FIG. 1 is a photograph of a light weight oriented net assembly for oil capture and containment having a single central crimp in accordance with the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
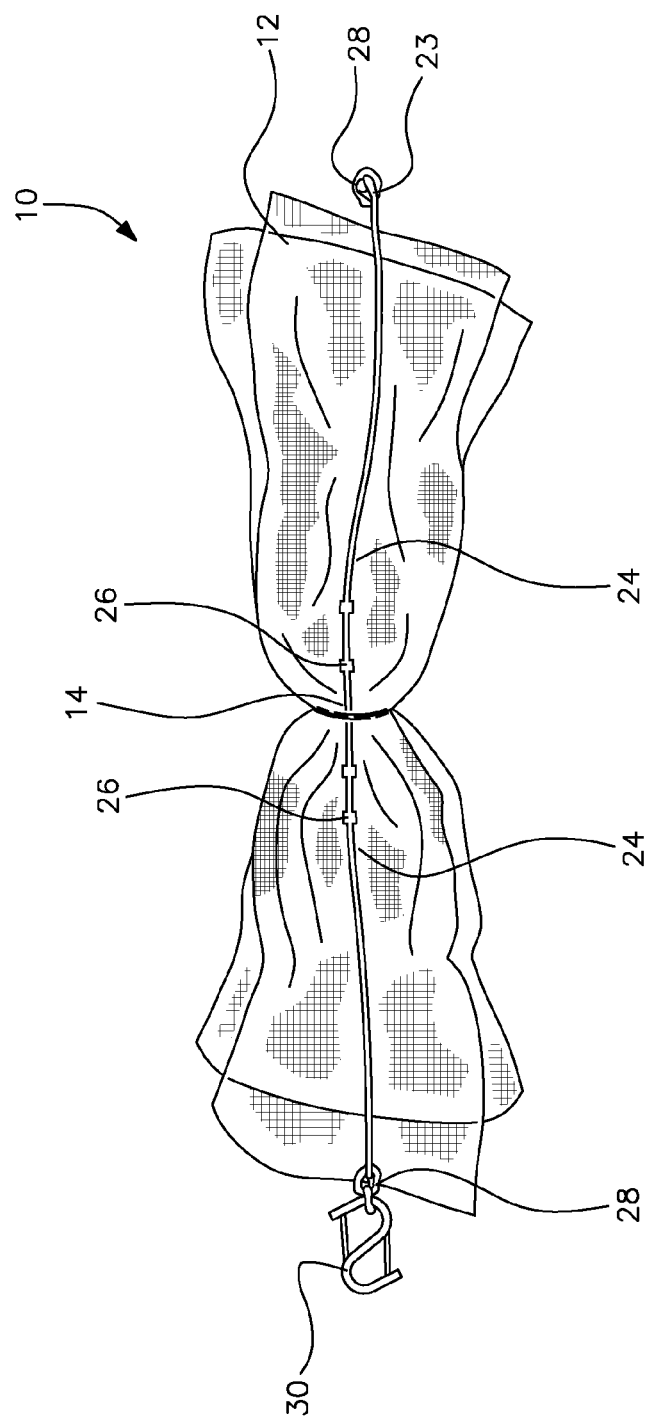
FIG. 2 is a photograph of a light weight oriented net assembly for oil capture and containment having a single central crimp as in FIG. 1, and also including a handling and connection element in accordance with the present invention.
Figure 3:
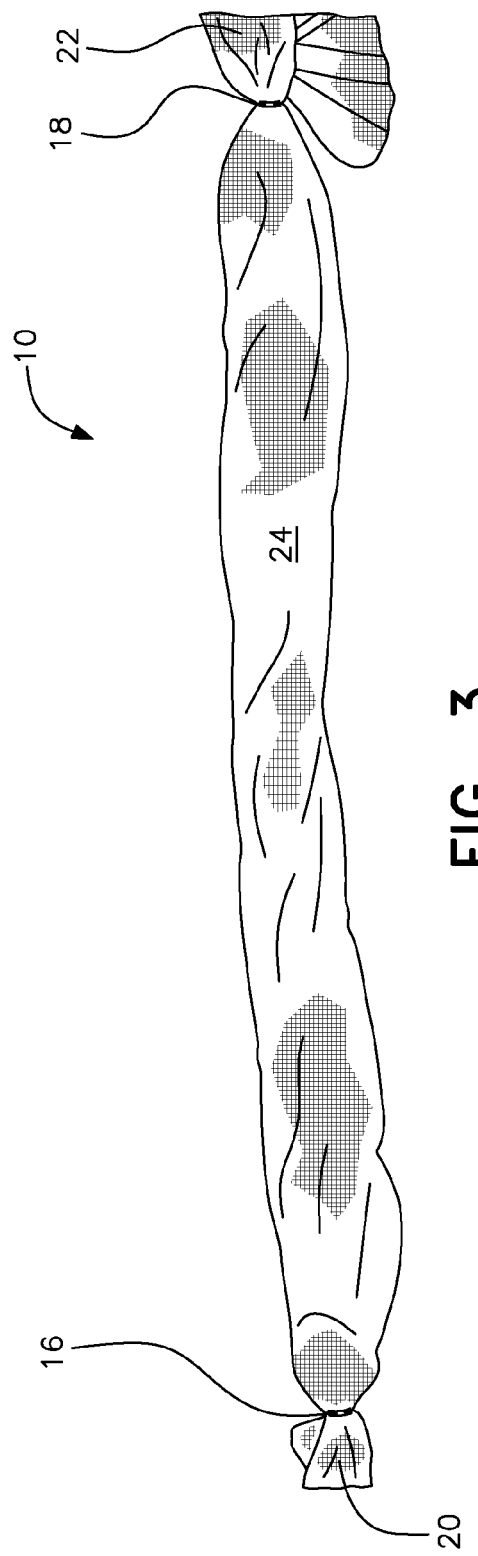
FIG. 3 is a photograph of another light weight oriented net assembly for oil capture and containment having end crimps according to the present invention.
Figure 4:
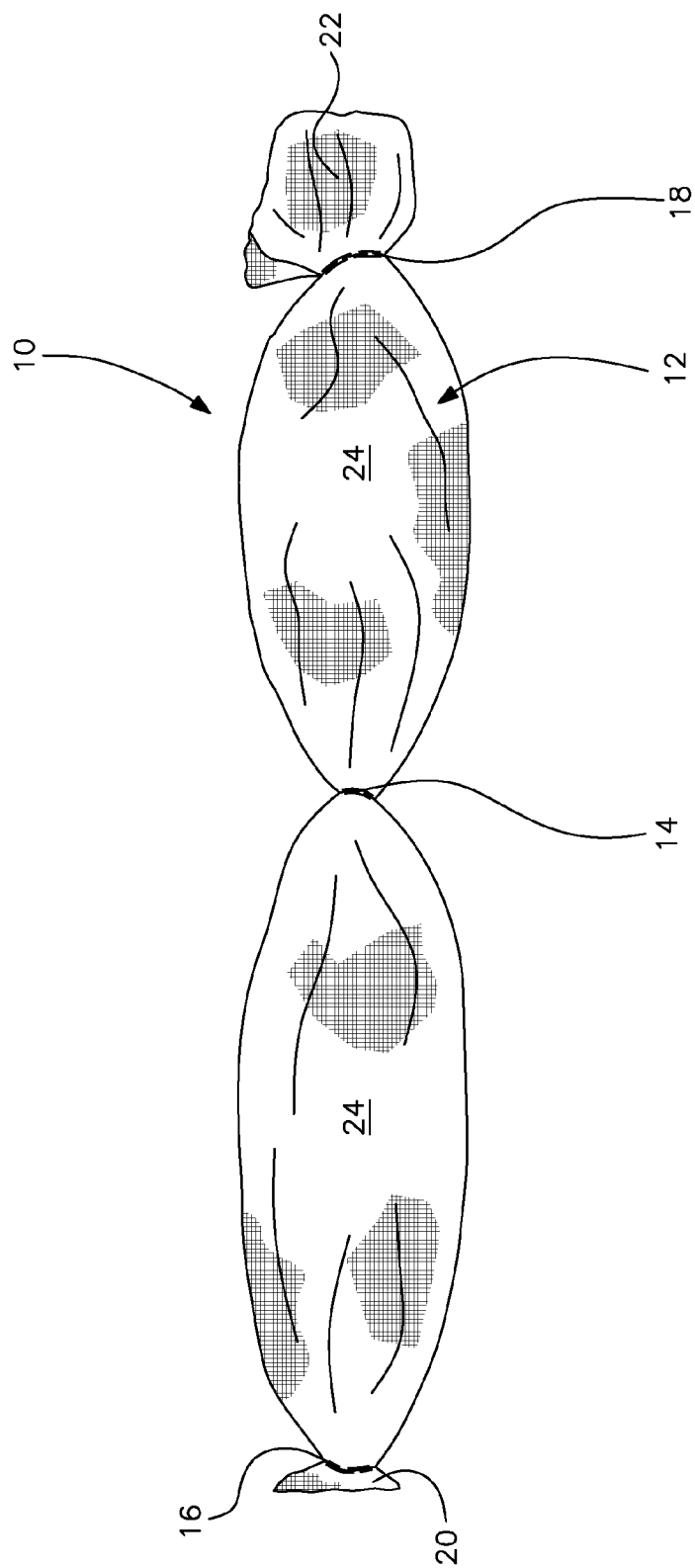
FIG. 4 is a photograph of a much larger light weight oriented net assembly for oil capture and containment having central and end crimps according to the present invention.

As shown in FIGS. 1-4, the present invention is directed to a light weight oriented net or netting assembly for oil capture and containment generally designated by reference numeral 10. The light weight oriented net or netting assembly 10 is preferably made of polypropylene netting or net material 12 that is plied, rolled, spiraled, folded, gathered or bunched in a manner as to create multiple layers. When the desired number of layers has been achieved, the stack of layers is gathered or bundled widthwise and secured with a crimp element 14 that is located at approximately the center of the layered netting material 12 in the lengthwise direction. The oriented netting assembly may alternatively be crimped with end crimps 16, 18 near each end 20, 22, while the center is not crimped as shown in FIG. 3. The layered netting or net material 12 may also be crimped with both end crimps 16, 18 near each end 20, 22 and a central crimp element 14 as shown in FIG. 4.

As shown in FIGS. 1-4, the result of crimping in accordance with the present invention is to create a "bow tie" or tubular configuration in which the width of the layered netting where the layers have been gathered together is secured while allowing for a significant amount of the surface area of the netting to be exposed between the crimps during use.

In particular, by crimping the multiple layers of netting, net cavities 24 are created on each side of the crimp(s). These net cavities 24 form an open cell structure for the net assembly 10 in order to maximize the surface area of the netting layers for better capture and containment of the oil. The net cavities 24 thus allow for greater oil retention both while the oriented netting assembly is in service and as the netting assembly is being removed from the water as will be discussed more fully hereinafter. The crimps 14, 16, 18 are preferably made using zip ties, although other crimp elements as well as any number of crimping or tying methods may also be used to create the bow tie configuration as would be understood by persons of skill in the art.

Moreover, the spacing of the crimps allows the oriented netting forming the net cavities 24 to expand and contract in the length and width directions as the crimps move closer or further apart, respectively, under the influence of water flow or current. Also, the "free" end portions of the net positioned outside the outermost crimps and forming the ends of the crimped assembly are free to expand and contract as influenced by water movement. As a result, the netting assembly according to the present invention does not have a fixed width or length during use, enabling the assembly to adapt to the water conditions in which it is placed during use.

As shown in FIG. 2, the bow tie configuration of the oriented netting assembly may include a handling and connection element 23. In the embodiment shown, the handling and connection element 23 is a rope, but other materials or components could also be used as would be understood by persons skilled in the art. However embodied, the handling and connection element 23 provides a "handle" to assist in installation and removal of the net assembly from an oil capture site. Also, as would be understood, the tubular configuration shown in FIG. 4 may be similarly equipped with a handle element 23.

When configured as a rope, the handling and connection element 23 is preferably provided with a series of knots 26 in the lengthwise center of the rope. The knots catch on the crimp 14 and prevent the rope from pulling out of the oriented netting assembly 10 when the rope is used to move the assembly. In addition, the rope 23 may be provided with a loop 28 tied at each end and a fastener 30 at one of the ends by which the bow tie configuration of the oriented netting assembly can be attached to another similar netting assembly to create a string of connected assemblies for use in large oil recovery situations.

Figure 5:
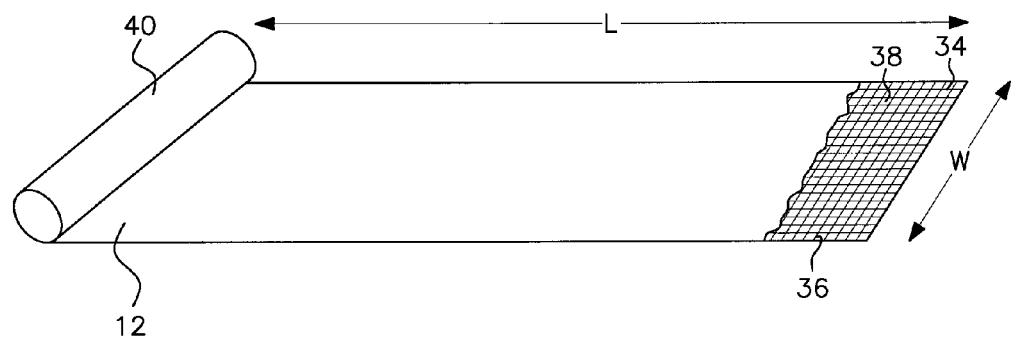
FIG. 5 is a sketch of a roll of oriented polypropylene netting with a length unrolled for forming a light weight oriented net assembly for oil capture and containment in accordance with the present invention.
Figure 6:
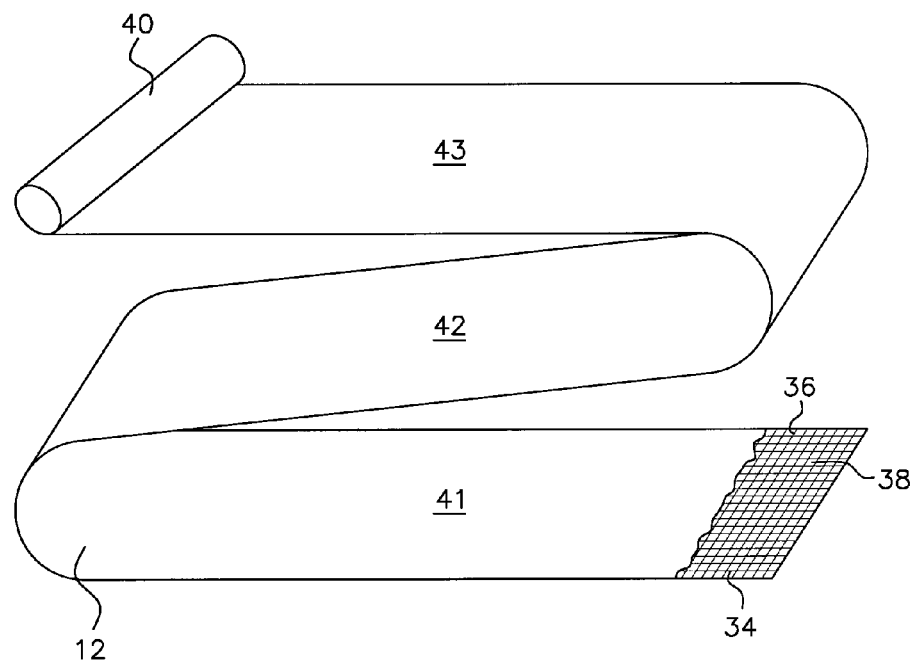
FIG. 6 is a sketch of the roll shown in FIG. 5 having been unrolled and folded to form three layers which will be crimped to form a light weight oriented net assembly for oil capture and containment in accordance with the present invention.

As can be seen in FIGS. 1 and 2, and as best shown by the partially sketched strands in FIGS. 5 and 6, the netting 12 includes a plurality of lengthwise oriented strands 34 and widthwise oriented strands 36 formed by orienting, or stretching, the netting or net material 12 during manufacture. Orienting of the netting or net material 12 is performed according to conventional processes as is known in the art of net and netting manufacture. In this regard, light weight biaxial nets have been manufactured for many years primarily from a tubular cast extrusion process, and are used in many applications including carpet backing, erosion control, filtration support, etc. Such nets may be integrally cast and then stretched using any of a variety of well known techniques such as those described, for example, in U.S. Pat. No. 2,919,467 to Mercer; U.S. Pat. No. 3,070,840 to Mercer; U.S. Pat. No. 3,252,181 to Hureau; U.S. Pat. No. 3,317,951 to Hureau; U.S. Pat. No. 3,384,530 to Mercer et al.; U.S. Pat. No. 3,384,692 to Galt et al.; U.S. Pat. No. 3,496,965 to Hureau; U.S. Pat. No. 3,917,889 to Gaffney et al.; and U.S. Pat. No. 4,756,946 to Mercer.

The subject matters of all of the foregoing identified nine patents are expressly incorporated by reference in this application as if set forth fully herein. These patents are cited as illustrative, and are not considered to be all inclusive, or to exclude other techniques known in the art for the production of oriented nets.

Once oriented, the netting has integral strands and junctions that are strong enough to maintain the integrity of the netting assembly both during use and while being drawn out of contaminated water after having adsorbed a large quantity of oil. The oriented net or netting according to the present invention typically has mesh openings or apertures 38 defined by the crossing strands that are generally square with each side preferably measuring between about 0.20 inches and about 1.5 inches. However, the net or netting structure is not limited to generally square apertures nor to regular openings, but can include a wide range of regular and/or irregular openings arranged in a generally consistent pattern or in an irregular pattern that create an open structure having a large surface area for oil adherence capture. In this regard, oriented net or netting that falls short of product specifications for use in a given industry may still be effectively used as an oil capture and containment assembly in accordance with the present invention, with a resulting reduction in manufacturing waste.

In addition, the openings in the netting, whether regular or irregular in themselves, form irregular channels or openings through the assembly once the layers are crimped, due to the bunching and gathering of the layers. As a result, while the assembly has an open cell structure that maximizes the surface area to which the oil can adhere, both the bow tie and the tubular configurations create an irregularity in the passages through the assembly that are otherwise created by the apertures in the oriented netting. So unlike a flat net in which the openings are regular and extend entirely through the assembly so that a straight object like a rod can be pushed through the structure's openings from one side of the net to the other, the bow tie and tubular configurations force the openings in various layers out of alignment such that a straight object cannot be easily threaded through the assembly. As a result, the net assembly according to the present invention has an improved ability to retain oil adhered thereto when the net assembly is removed from the water.

The light weight oriented netting 12 is typically made in a roll 40 as shown in FIGS. 5 and 6, or may be made according to other conventionally known methods of polymer netting manufacture. The light weight netting 12 is made of a polymer, preferably polypropylene, that has an inherent affinity for oil. Preferably, the polymer has a melt index range of between about 0.5 g/10 mins and about 4.0 g/10 mins. Other polymers may also be used, such as a polyethylene polymer, provided the polymer chosen has an affinity for oil. The netting or net material may be made in various colors ranging from green and black to clear.

Depending upon the thickness of the strands, the weight of the netting 12 per square foot will vary. A preferred weight range for polypropylene netting in accordance with the present invention is between about 0.75 lb/1,000 sq. ft. and about 30 lb/1,000 sq. ft. With netting weights within this range, the resulting oil capture and containment assemblies 10 made from this material are light in weight, buoyant so as to remain adjacent the water surface, and yet, due to their oriented structure and integrally formed strands and junctions, are strong enough to make an outside containment and stabilizing jacket unnecessary during use of the netting assemblies to capture and remove oil from contaminated water. By eliminating the outer jacket, the total oil-exposed surface area of the polypropylene netting is effectively increased, thereby increasing oil capture and containment capability for a given weight and surface area of the oriented netting.

As illustrated in FIG. 6, according to one method of manufacture, the roll 40 of oriented netting is unrolled to a desired length and then folded, gathered, bunched and/or laid down upon itself until the desired number of layers has been reached. Three layers are shown at the stage of production shown in FIG. 6, but it is preferred to have the oriented netting layered between about 16 and 64 times to form one of the bow tie configuration assemblies. Using the roll method of manufacture, the oriented netting assemblies can be made to any desired length, with netting assemblies up to 100 feet long or more being possible. With longer netting assemblies, more crimps may be used, effectively creating more oil retaining pockets 24 between the crimps. However, the crimps should be spaced well apart to multiply the amount of netting that is exposed over a given length. Preferably the crimps are at least five feet apart to allow for spreading of the netting and to maximize the netting surface area and resulting oil capture and containment. The width of the net is limited by the manufacturing equipment used to make the rolls, with the width of the roll generally being between about 23 inches to a maximum of about 250 inches.

Figure 7:
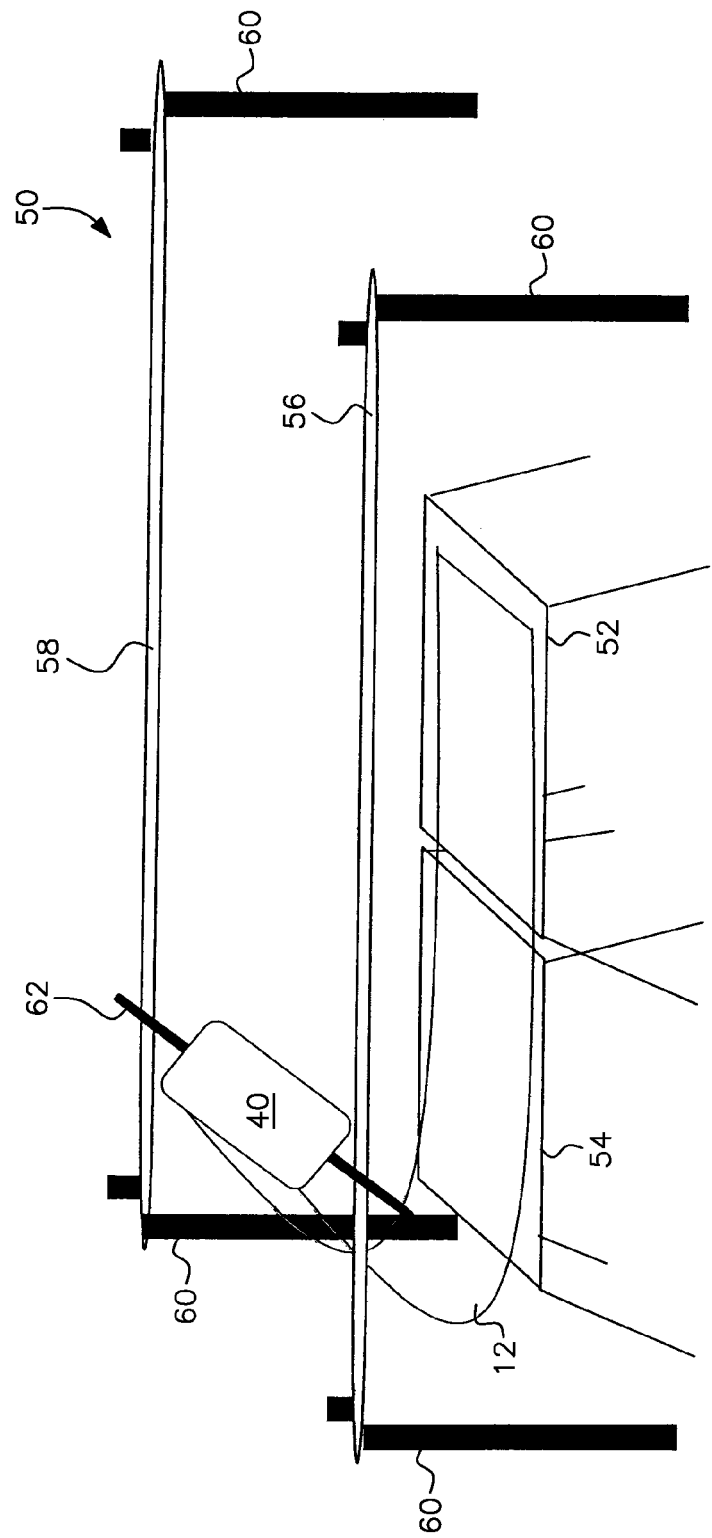
FIG. 7 is a drawing of a representative fabrication set-up for converting light weight oriented polypropylene netting rolls into oil capture and containment assemblies through the layering procedure illustrated in FIG. 6.

A representative fabrication set-up for converting light weight oriented netting rolls into oil capture and containment assemblies through the layering procedure is illustrated in FIG. 7 and generally designated by reference numeral 50. Other fabrication set-ups may also be used. According to the manufacturing embodiment shown in FIG. 7, the fabrication set-up 50 includes at least one layout table 52 upon which the oriented netting is unrolled to a desired length. Additional layout tables, such as the two tables 52, 54 shown in FIG. 7, may be placed side by side to support a longer netting assembly. Positioned over and on either side of the tables is a horizontal bar 56, 58 supported by steel support beams 60. The bars 56, 58 may be used to support the two opposite ends of a rod 62 that is passed through the center of the roll 40 to allow the roll to be unrolled while supported by the rod 62. By sliding the rod 62 along the bars 56, 58 back and forth over a distance corresponding with the length of the layout tables 52, 54 below while unrolling the roll 40, multiple layers of the netting 12 can be laid down, one upon the other, and supported upon the tables to form a netting assembly 10.

In addition to the bow tie and tubular configurations, oil capture and containment netting assemblies according to the present invention may be made in a layered pillow configuration, similar to that used in prior art products. In the layered pillow configuration, netting in accordance with the product specifications already summarized above is layered and fitted within an outer casing of the same material.

In a further configuration, multiple layers of oriented netting are sewn together along one side edge of the stacked, bundled or otherwise gathered layers to create an assembly that resembles a book. Test results of the effectiveness of oil capture and containment oriented netting assemblies in the book configuration are summarized by the first trial as set forth in the Table I below.

TABLE I

First Trial
Effectiveness Testing of "Pillow" versus stretched net

| Test # | Description | Weight of Water and Oil (lb.) | Weight of Pad before introduction (lb.) | Weight of Material after introduction (lb.) | Weight gain of material (lb.)* | Weight of Pool after test | lb captured/lb of polypro |
|---|---|---|---|---|---|---|---|
| 1 | Stretched 1.1 lb net inside single 1.1 lb cast pillow | 142.5 | 0.40 | 1.42 | 1.02 | 141.0 | 2.55 |
| 2 | Fluff inside single 1.1 lb cast pillow | 141 | 1.70 | 2.86 | 1.16 | 139.5 | 0.68 |
| 3 | Fluff inside double 1.1 lb cast pillow | 139.5 | 0.96 | 1.84 | 0.88 | 139.0 | 0.92 |
| 4 | Stretched net 3.7C sewn together on one side "Book" 8 Layers | 139 | 0.10 | 1.06 | 0.96 | 138.0 | 9.60 |

*This includes any trapped water
Independent Variables
Oil Added to Pool (lb)    1.8
Water in Pool (lb)    140
% Oil in water    1.3%

During the first trial, the book configuration of the oil capture and containment netting assembly (Test #4) was tested against three prior art products including a stretched net inside a single cast pillow (Test #1), fluff inside a single cast pillow (Test #2), and fluff inside a double cast pillow (Test #3). For each test, 1.8 pounds of oil was poured into 140 pounds of water contained in a molded backyard pool of the kind used by small children.

The book configuration according to the present invention was made with oriented clear (C) polypropylene netting having a weight of 3.7 lbs/1,000 sq. ft. A specification sheet for this commercially available netting is set forth below in Table II.

TABLE II

| Product | LW037C |
|---|---|
| Structure Type | Light Weight-Oriented |
| Polymer Type | Polypropylene |
| Color | Clear/Natural |
| Unit Weight | 3.7 lb./M Ft$^2$ |
| MD & TD Mesh Size | 0.25" × 0.25" Target |
| MD & TD Tensile Strength | 28.0/23.0 MD/TD min. lbs/3 inches |

Note:
All values in table are NOMINAL unless otherwise specified

In the same way described earlier, the book configuration used for testing was fabricated using eight layers of 3.7 lbs/1,000 sq. ft. oriented netting sewn together along a single side edge to form the "book". The testing showed that the book according to the present invention was found to adsorb 9.60 pounds of oil per pound of polypropylene netting. With the best of the three prior art products, results of only 2.55 pounds of oil per pound of polypropylene netting were obtained.

While the results obtained with the book configuration of the oil capture and containment netting assembly were about 3-14 times better than the prior art pillow-style products, the bow tie configuration netting assembly such as that shown in FIG. 1 was found to have even greater effectiveness, as shown by the second trial summarized in Table III below.

TABLE III

Second Trial
Bow Tie Testing Data

| Test # | Description of Bow Tie | Weight of Oil grams | Weight of Water grams | Weight of Bow Tie grams | Weight of Bow Tie after introduction grams | Weight gain of Bow Tie grams | Weight of water oil mixture after test grams | lb captured/lb of polypro | Average lb captured/lb of polypro of the two test |
|---|---|---|---|---|---|---|---|---|---|
| 1 | Stretched 1.1C net, 8 layers | 129.6 | 400 | 4.73 | 46.02 | 41.29 | 481.2 | 8.73 | |
| 2 | Stretched 1.1C net, 8 layers | 131.2 | 400 | 4.82 | 46.15 | 41.33 | 452.0 | 8.57 | 8.65 |
| 3 | Stretched 1.1C net, 16 layers | 236.4 | 400 | 8.84 | 176 | 167.16 | 499.0 | 18.91 | |
| 4 | Stretched 1.1C net, 16 layers | 285.12 | 400 | 9.20 | 212 | 202.80 | 501.1 | 22.04 | 20.47 |
| 5 | Stretched 1.1C net, 32 layers | 558.92 | 600 | 16.1911 | 441.34 | 425.15 | 745.34 | 26.26 | |
| 6 | Stretched 1.1C net, 32 layers | 560.12 | 600 | 17.1911 | 436.85 | 418.46 | 740.89 | 24.34 | 25.30 |
| 7 | Stretched 1.1C net, 64 layers | 880.67 | 600 | 24.7511 | 603.56 | 578.81 | 852.3 | 23.39 | |
| 8 | Stretched 1.1C net, 64 layers | 854.29 | 600 | 23.5531 | 619.94 | 578.39 | 876.2 | 25.32 | 24.35 |
| 9 | Stretched 1.1C net, 1 layers | | | 0.6171 | | 3.45 | | 5.59 | |

While not intending to be bound by the following technical analysis in this paragraph, it is believed that the improved effectiveness of the bow tie configuration is due in part to the larger surface area presented to the oil. In the book configuration, the "pages" do not create net cavities or an open cell structure and, therefore, the book configuration has a less than optimal oil retention ability when being removed from the oil-contaminated water. In the prior art pillow configurations, the affinity of the oil for the outside of the pillow effectively blocks additional oil from being adsorbed into the center of the pillow. In addition, as noted previously, the bow tie configuration yields improved results over conventional pillow designs as well as the book configuration due to the crimping and the resulting creation of net cavities on each side of the crimp(s). These net cavities allow for greater oil retention both while the oriented netting assembly is in service and as the assembly is being removed from the water.

Test results of the effectiveness of oil capture and containment oriented net or netting assemblies in the bow tie configuration are summarized by the second trial as set forth in Table III. In the second trial, five bow tie netting assemblies made of oriented clear (C) polypropylene netting having a weight of 1.1 lbs/1,000 sq. ft. were tested over a series of nine tests. A specification sheet for this commercially available clear netting is set forth hereinafter in Table IV. In addition, a specification sheet for black netting of the same weight is provided thereafter in Table V.

TABLE IV

| Product | LW011C |
| --- | --- |
| Structure Type | Light Weight-Oriented |
| Polymer Type | Polypropylene |
| Color | Clear/Natural |
| Unit Weight | 1.1 lb./M Ft$^2$ |
| MD & TD Mesh Size | 0.25" × 0.25" Target |
| MD & TD Tensile Strength | 5.0/4.0 MD/TD min. lbs/3 inches |

Note:
All values in table are NOMINAL unless otherwise specified

TABLE V

| Product | LW011B |
| --- | --- |
| Structure Type | Light Weight-Oriented |
| Polymer Type | Polypropylene |
| Color | Black |
| Additives | Min. 0.1% Carbon Black |
| Unit Weight | 1.1 lb./M Ft$^2$ |
| MD & TD Mesh Size | 0.25" × 0.25" Target |
| MD & TD Tensile Strength | 5.0/4.0 MD/TD min. lbs/3 inches |

Note:
All values in table are NOMINAL unless otherwise specified

In the second trial, the first oriented netting assembly had eight layers (Tests #1 and #2), the second oriented netting assembly had 16 layers (Tests #3 and #4), the third oriented netting assembly had 32 layers (Tests #5 and #6), the fourth oriented netting assembly had 64 layers (Tests #7 and #8), and the fifth oriented netting assembly had one layer (Test #9).

As is evident from the results, the best performance was obtained during Tests #5-6 and Tests #7-8, using bow tie netting assemblies having 32 and 64 layers, respectively. As a result of both these trials and additional testing, it has been determined that when layered between 16 and 64 times, the bow tie netting assembly 10 initially captures and contains a quantity of oil approximately 20 to 25 times the initial weight of the net or netting. Once the oil in the netting is removed, such as by pressing or other removal process, the netting assembly 10 may be reused and, during multiple re-uses, has been found to repeatedly capture and contain a quantity of oil approximately 15 to 16 times its weight during each subsequent use. Results obtained during testing to determine the effective capture and containment quantities of a bow tie netting assembly as configured in FIG. 1 and having 32 layers after multiple uses are set forth in Table VI (Test #11 and Test #12) which follows.

TABLE VI

Fourth Trial
Determination of effective capture and containment after multiple uses

| Test # | Description of Pillow | Weight of Oil grams | Weight of Water grams | Weight of Bow Tie before introduction grams | Weight of Bow Tie after introduction grams | Weight of Bow Tie after press | Weight of Bow Tie after introduction 2nd time grams | Weight of Bow Tie 2nd press | Weight of Bow Tie after introduction 3rd introduction grams |
| --- | --- | --- | --- | --- | --- | --- | --- | --- | --- |
| 11 | Stretched 1.1C net, 32 layers lbs absorbed per lb of polypro | 560.12 | 600 | 17.19 | 435.65 24.34 | 27.19 | 434.34 14.97 | | |
| 12 | Stretched 1.1C net, 32 layers lbs absorbed per lb of polypro | | | 17.56 | 442.6 24.21 | 25.8275 | 445.2 16.24 | 26.2479 | 442.16 15.85 |

In addition, the oriented netting assemblies work quickly, with each netting assembly achieving substantially its maximum oil capture and containment capacity in approximately 10 minutes. Results obtained when testing a bow tie netting assembly as configured in FIG. 1 and having 16 layers to determine the adsorption rate over time are set forth in Table VII below.

TABLE VII

Third Trial
Determination of adsorbtion rate over time

| Test # | Description of Pillow | Weight of Oil grams | Weight of Water grams | Weight of Bow Tie before introduction grams | Weight of Bow Tie after introduction 10 min grams | Weight of Bow Tie after introduction 20 min grams | Weight of Bow Tie after introduction 30 min grams |
|---|---|---|---|---|---|---|---|
| 1 | Stretched 1.1C net, 16 layers lbs absorbed per lb of polypro | 286.4 | 480 | 8.84 | 166.22 17.80 | 174.12 18.69 | 176 18.91 |

As shown in Table VII, the weight gain measured in the netting assembly after 10 minutes was significant, while each subsequent 10 minute interval thereafter yielded small additional oil adsorption returns. In Table VII, the three weight values of the bow tie assembly as set forth in the first row (166.22, 174.12 and 176) represent the actual weights of the bow tie samples after 10, 20 and 30 minutes, respectively. The three values appearing in the second row immediately under the first row represent the respective ratios of the amount of material adsorbed (determined by subtracting the initial bow tie sample weight from the weight values in the first row) divided by the initial weight of the bow tie sample (8.84) for each of the 10, 20 and 30 minute increments.

Once the oriented net or netting assemblies with their captured oil quantity are removed from the water, the oil can be removed and refined for subsequent use. Various methods of removal may be employed as would be understood by persons of skill in the art. According to one preferred method, the oil is pressed out of the net or netting assembly by applying squeezing pressure to the netting, as one would squeeze a sponge or wring out a mop with two rollers, and collecting the oil that is thereby "wrung out".

In addition, during sequential testing of the bow tie oriented netting assemblies in water contained in the pool described above, each assembly was found to effectively capture oil released in the pool by pulling the assembly back and forth through the oil. Alternatively, the netting assembly according to the present invention also worked effectively to capture the oil when the water was agitated to create waves, as by lifting and lowering one side of the pool. This performance capability in response to "wave action" makes the bow tie netting assemblies excellent candidates for oil spill clean-up in seas, oceans or other open water where natural water wave movement is typically encountered.

Further, the open mesh structure according to the present invention, with the irregular channels or openings through the assembly, has the advantage of maximizing the surface area of the polypropylene that the oil can adhere to, thereby improving its oil capture capabilities relative to a more solid structure, such as a sock filled with absorbent material, or a net in which all of the openings are regular and extend entirely through the assembly such that a straight object such as a rod could be pushed entirely through the structure's openings.

The foregoing descriptions and drawings should be considered as illustrative only of the principles of the invention. The invention may be configured in a variety of shapes and sizes and is not limited by the dimensions of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. An oil capture and containment assembly comprising a plurality of layers of light weight oriented netting made of an oil adsorbing polymer, said layers being secured with a crimping element to form a bow tie configuration for said assembly.

2. The oil capture and containment assembly as set forth in claim 1, wherein said oil adsorbing polymer is polypropylene.

3. The oil capture and containment assembly as set forth in claim 1, wherein said plurality of layers of light weight oriented netting includes at least sixteen layers.

4. The oil capture and containment assembly as set forth in claim 1, wherein said bow tie configuration formed by said crimp includes net cavities and an open cell structure that increases an overall surface area of said netting for better capture and containment of oil dispersed in water.

5. The oil capture and containment assembly as set forth in claim 1, wherein said bow tie configuration formed by said crimp forms irregular channels through the assembly for increased surface area and better retention of captured oil when the assembly is removed from oil-contaminated water.

6. A method of manufacturing an oil capture and containment assembly comprising the steps of:
   arranging a length of light weight oriented netting to have a plurality of layers; and
   securing the layers with a crimping element in at least one location of said netting to form net cavities and an open cell structure that increases an overall surface area of said netting for better capture and containment of oil dispersed in water.

7. The method as set forth in claim 6, wherein said step of arranging includes creating at least sixteen layers of said netting.

8. The method as set forth in claim 6, wherein said step of securing the layers includes crimping the netting in about a longitudinal center of said length.

9. A method of capturing and containing oil dispersed in water comprising:
   forming an oil capture and containment assembly having a plurality of layers of light weight oriented netting made of an oil adsorbing polymer, said layers being secured with a crimping element to form a bow tie configuration for said assembly;
   placing the assembly into water contaminated with oil; and
   allowing said assembly to adsorb a quantity of said oil through contact between said assembly and the oil.

10. The method as set forth in claim 9, further comprising the steps of:
    removing the assembly with the quantity of adsorbed oil from the water; and
    reclaiming said adsorbed oil from said assembly; and
    reusing said assembly to capture and contain more oil.

11. The method as set forth in claim 9, wherein said step of forming said assembly includes arranging said assembly to have at least sixteen layers and crimping said layers together in approximately a center thereof.

12. An oil capture and containment assembly comprising a plurality of layers of light weight oriented netting made of an oil adsorbing polymer, said layers being secured with a crimping element at each end to form a tubular configuration for said assembly.

13. The oil capture and containment assembly as set forth in claim 12, wherein said oil adsorbing polymer is polypropylene.

14. The oil capture and containment assembly as set forth in claim 12, wherein said plurality of layers of light weight oriented netting includes at least sixteen layers.

15. The oil capture and containment assembly as set forth in claim 12, wherein said tubular configuration formed by said crimps includes net cavities and an open cell structure that increases an overall surface area of said netting for better capture and containment of oil dispersed in water.

16. The oil capture and containment assembly as set forth in claim 12, wherein said tubular configuration formed by said crimps forms irregular channels through the assembly for increased surface area and better retention of captured oil when the assembly is removed from oil-contaminated water.

* * * * *